(No Model.)

W. G. BROWNE.
CAN OPENER.

No. 501,322. Patented July 11, 1893.

WITNESSES
H. A. Lamb
P. M. Reynolds

INVENTOR
William G. Browne
By A. M. Wooster
Atty.

UNITED STATES PATENT OFFICE.

WILLIAM G. BROWNE, OF MERIDEN, CONNECTICUT, ASSIGNOR TO THE BROWNE & DOWD MANUFACTURING COMPANY, OF SAME PLACE.

CAN-OPENER.

SPECIFICATION forming part of Letters Patent No. 501,322, dated July 11, 1893.

Application filed December 28, 1892. Serial No. 456,564. (No model.)

*To all whom it may concern:*

Be it known that I, WILLIAM G. BROWNE, a citizen of the United States, residing at Meriden, in the county of New Haven and State of Connecticut, have invented certain new and useful Improvements in Can-Openers; and I do hereby declare the following to be a full, clear, and exact description of the invention, such as will enable others skilled in the art to which it appertains to make and use the same.

My invention relates to the class of can openers for which Letters Patent No. 475,222 were granted to William G. Browne and John L. Benton, May 17, 1892, and has for its object to provide a can opener of this general class, the manufacture of which shall require less operations and less high priced metal, so that while the article as a whole will be for all practical purposes as good as the former can opener it may be produced at a price that will enable it to be placed upon the market at a very much lower price.

With these ends in view I have devised the simple and novel can opener which I will now describe referring by numbers to the accompanying drawings forming part of this specification in which—

Figure 1:
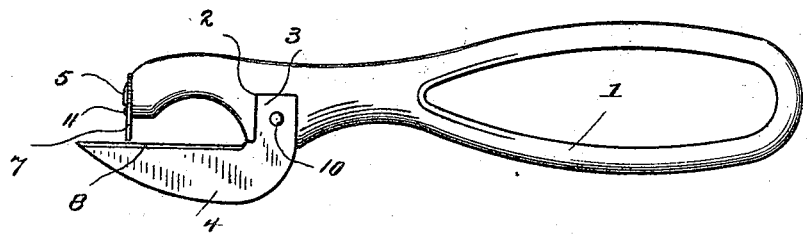
Figure 2:
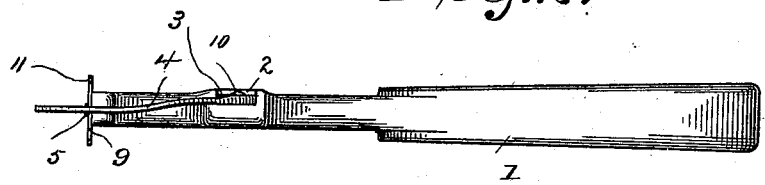
Figure 3:
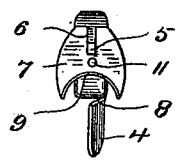

Figure 1 is a side elevation; Fig. 2 an inverted plan view, and Fig. 3 an end view of my novel can opener as it is preferably constructed, it being understood however that the special details of construction and connection of the parts are not of the essence of my invention.

My improved can opener is preferably made in three pieces which are secured together by two rivets.

1 denotes the handle which is provided with a recess 2 to receive a tang 3 upon the blade 4, and is also preferably provided with a lug 5 at its extreme forward end which is adapted to lie when the parts are assembled, in a notch 6 in a fulcrum 7 which is placed transversely to the blade.

In my present can opener both blade and fulcrum are blanked out independently from spring steel. No tempering is therefore required. The blade is formed at a single operation to the shape shown in Fig. 1 and simply requires to have a cutting edge 8 made thereon. The fulcrum is so small that in practice I make it from small pieces of scrap steel and blank them out at a single operation to the form shown in Fig. 3, the essential feature of the fulcrum being the notch 9 which receives the edge of the can in use as fully described in the said Browne and Benton patent referred to. The edge of notch 9 in the fulcrum may or may not be beveled. In practice when the fulcrum is made in this form I make it of comparatively thin steel and find that I get ample strength and that the edge of the notch will bite the edge of the can sufficiently to prevent slipping even if the notch is not beveled. In blanking out the fulcrum and blade are each provided with one rivet hole. In assembling the tang is placed in recess 2 and the blade secured to the handle by a single rivet 10. The fulcrum is placed in position with lug 5 on the handle engaging notch 6 in the fulcrum and is secured in position by a single rivet 11.

Having thus described my invention, I claim—

1. A can opener consisting of a handle and two metal plates one of said plates being secured across the end of the handle and provided with a notched lower edge, the second plate being secured to the handle in rear of its end extending forward beyond the end and beneath the notched plate, substantially as described.

2. A can opener, consisting of a handle recessed in rear of its front end, a blade secured in said recess extending beyond the end of the handle, a notched plate or fulcrum independent of the blade secured to the end of the handle and extending transversely to the blade, and a lug 5 on the handle end engaging a notch in the fulcrum, substantially as described.

In testimony whereof I affix my signature in presence of two witnesses.

WILLIAM G. BROWNE.

Witnesses:
E. A. MERRIMAN,
Z. E. DOWD.